(12) United States Patent
Chen et al.

(10) Patent No.: US 10,909,766 B2
(45) Date of Patent: Feb. 2, 2021

(54) VIDEO MAP ENGINE SYSTEM

(71) Applicant: GOSUNCN TECHNOLOGY GROUP CO., LTD., Guangdong (CN)

(72) Inventors: Shenghui Chen, Guangdong (CN); Guanjie Xu, Guangdong (CN); Chaowei Meng, Guangdong (CN); Weijian Hu, Guangdong (CN); Xianjing Lin, Guangdong (CN); Jianrong Zhong, Guangdong (CN); Zhuofeng Liu, Guangdong (CN); Zhizhao Deng, Guangdong (CN); Shengxin Jiang, Guangdong (CN); Kejun Luo, Guangdong (CN); Wenguo Gao, Guangdong (CN); Xiwan Ning, Guangdong (CN); Chunsen Qiu, Guangdong (CN); Tongyu Huang, Guangdong (CN); Gang Wang, Guangdong (CN); Yibing Song, Guangdong (CN); Yuqing Hou, Guangdong (CN); Shuangguang Liu, Guangdong (CN)

(73) Assignee: GOSUNCN TECHNOLOGY GROUP CO., LTD., Guangzhou (CN)

( * ) Notice: Subject to any disclaimer, the term of this patent is extended or adjusted under 35 U.S.C. 154(b) by 0 days.

(21) Appl. No.: 16/461,382

(22) PCT Filed: Feb. 1, 2019

(86) PCT No.: PCT/CN2019/074378
§ 371 (c)(1),
(2) Date: May 16, 2019

(87) PCT Pub. No.: WO2019/174429
PCT Pub. Date: Sep. 19, 2019

(65) Prior Publication Data
US 2020/0258304 A1    Aug. 13, 2020

(30) Foreign Application Priority Data

Mar. 15, 2018  (CN) .......................... 2018 1 0215658

(51) Int. Cl.
*G06T 19/00* (2011.01)
*G06F 9/54* (2006.01)
*H04L 29/06* (2006.01)

(52) U.S. Cl.
CPC .............. *G06T 19/006* (2013.01); *G06F 9/54* (2013.01); *H04L 67/38* (2013.01)

(58) Field of Classification Search
None
See application file for complete search history.

(56) References Cited

U.S. PATENT DOCUMENTS 7,777,783 B1* 8/2010 Chin ...................... H04N 7/181
                                                      348/211.99
8,331,611 B2* 12/2012 Johnson, II ............. G06F 16/70
                                                      382/100
(Continued)

FOREIGN PATENT DOCUMENTS

| CN | 205232356 U | 5/2016 |
| CN | 107426065 A | 12/2017 |
| CN | 107770496 A | 3/2018 |

*Primary Examiner* — Edward Martello

(57) ABSTRACT

A video map engine system includes a configuration management client, multiple video equipments, a video access server, an augmented reality processor, and an augmented reality client. The parameters of the video equipments includes azimuth angle P, vertical angle T and zoom factor Z of the video equipment, the augmented reality client is adapted for calculating the location where the augmented reality tag is presented in the real-time video according to the values of P, T, Z and the target location carried by the augmented reality tag, and presenting the augmented reality tag on the corresponding location of the real-time video. Therefore, the real-time video is served as the base map, and (Continued)

the augmented reality tag is presented on the base map, thereby achieving a video map effect.

11 Claims, 2 Drawing Sheets

(56) References Cited

U.S. PATENT DOCUMENTS

| | | | | |
|---|---|---|---|---|
| 2008/0196083 A1* | 8/2008 | Parks | ............... | H04L 67/125 |
| | | | | 726/1 |
| 2010/0287485 A1* | 11/2010 | Bertolami | ............... | G06F 3/011 |
| | | | | 715/764 |
| 2011/0141254 A1* | 6/2011 | Roebke | ............... | H04N 7/18 |
| | | | | 348/61 |
| 2013/0142384 A1* | 6/2013 | Ofek | ............... | H04W 4/023 |
| | | | | 382/103 |
| 2015/0135248 A1* | 5/2015 | Idaka | ............... | H04N 21/64322 |
| | | | | 725/115 |
| 2018/0089870 A1* | 3/2018 | Billi-Duran | ............... | G09B 5/02 |

\* cited by examiner

VIDEO MAP ENGINE SYSTEM

FIELD OF THE INVENTION

The present invention relates to map engines and, more particularly to a video map engine system.

BACKGROUND OF THE INVENTION

A Map engine is a set of function libraries that provide functions for driving and managing geographic data, and achieve functions of rendering and searching, etc. All application layer software only needs to call the function interface provided by the map engine, so as to complete its function. The existing map engine system uses a two-dimensional map or a three-dimensional map as a base map, and then adds a tag on the base map, so that the user can know the scene through the information on the tag. Conventionally, two-dimensional tile maps (namely simulated terrain images), and three-dimensional model maps (namely simulated terrain three-dimensional graphics) are used, but these are only simulated maps, which cannot return the user a real-time video or pictures.

SUMMARY OF THE INVENTION

For overcoming at least one of the above deficiencies, the present invention provide a video map engine system, which uses a real-time video as a base map in which an augmented reality tag can be presented on a target location of the base map to achieve a video map effect.

Accordingly, the present invention provides a video map engine system comprising a configuration management client, multiple video equipments, a video access server, an augmented reality processor, and an augmented reality client.

The augmented reality client is connected with the configuration management client, the video equipments, the video access server, and the augmented reality processor respectively.

The configuration management client is adapted for configuring and storing parameters of the video equipments, and sending the parameters of the video equipments to the augmented reality client.

The video equipments are adapted for shooting real-time videos, and a part of the video equipments are further adapted for shooting augmented-reality real-time videos.

The video access server connected with the video equipments is adapted for sending the real-time video to the augmented reality client.

The augmented reality processor is adapted for generating augmented reality tags with target locations and sending the augmented reality tags with target locations to the augmented reality client, and further adapted for deleting the augmented reality tags with target locations and sending deleting information to the augmented reality client.

The augmented reality client comprises processing circuitry which is configured as follows:

once a target location of an augmented reality tag is detected to be a GPS coordinate, calculating a video coordinate of the augmented reality tag presented in the real-time video accordingly to the parameters of the video equipments and the GPS coordinate of the augmented reality tag, integrating the augmented reality tag with the real-time video sent by the video access server, and presenting the augmented reality tag at a corresponding location of the real-time video in virtue of the video coordinate; or once a target location of an augmented reality tag is detected to be video coordinate, integrating the augmented reality tag with the real-time video sent by the video access server, and presenting the augmented reality tag at a corresponding location of the real-time video in virtue of the video coordinate.

That is, if the target location of the augmented reality tag is the video coordinate, the augmented reality tag can be presented at the corresponding location of the real-time video, without calculating the coordinate. If the target location of the augmented reality tag is the GPS coordinate, then the video coordinate is required to be calculated, thereby determining the location where the augmented reality tag is presented in the real-time video.

When the real-time video shot by the video equipment is played at the augmented reality client, the augmented reality tag is presented at a corresponding location of the real-time video, that is, the real-time video is served as the base map, and the augmented reality tag is presented at the target location of the base map, thereby achieving a video map effect.

The augmented reality processor is further adapted for deleting the augmented reality tags with target locations that have been generated, so that the user can manage the augmented reality tags conveniently.

Further, the parameters of the video equipments comprises azimuth angle P, vertical angle T of the target location relative to spatial location of the video equipment, and zoom factor Z of the video equipment.

By means of the principle of projection, accordingly to the azimuth angle P, the vertical angle T, the zoom factor Z and the GPS coordinate of the augmented reality tag, the location of the augmented reality tag presented in the real-time video (namely the video coordinate of the augmented reality tag) can be calculated out, thereby determining the location where the augmented reality tag presented in the real-time video.

Further, the configuration management client is adapted for judging if the values of the azimuth angle P, the vertical angle T and the zoom factor Z are the same with that stored in the configuration management client, if no, the augmented reality client is adapted for calculating a new location where the augmented reality tag is presented in the real-time video accordingly to the target location of the augmented reality tag and current values of the azimuth angle P, the vertical angle T and the zoom factor Z, and presenting the augmented reality tag at a corresponding new location of the rear-time video, and the configuration management client is adapted for updating the current values of the azimuth angle P, the vertical angle T and the zoom factor Z; if yes, the location of the augmented reality tag in the rear-time video is not changed.

During shooting the real-time video, the camera lens of the video equipment will move or rotates, that is, the values of P, T, Z relative to the target location will change, and the location where the augmented reality tag is presented at the real-time video will change accordingly. Firstly, the configuration management client 101 judges that if the values of P, T, Z of the video equipment are changed, if yes, augmented reality client needs to recalculate the location where the augmented reality tag is presented at the real-time video; otherwise, the augmented reality tag will not move along with the target location when the real-time video is playing. If the values of P, T, Z are not changed, the target location will not move in the real-time video, and the augmented reality tag is kept in the initial location.

Further, the augmented reality tag is composed of at least one point which is a GPS coordinate point of the target location or a video coordinate point.

Specifically, the augmented reality tag can be a point, or a line composed of two points, or a plane composed of multiple points. If the augmented reality tag is a point, this point is the GPS coordinate point or the video coordinate point of the target location; if the augmented reality tag are multiple points, one of the multiple points is the GPS coordinate point or the video coordinate point of the target location, therefore the augmented reality tag with the target location is formed.

Further, the augmented reality tag is one or more selected from a group of a point tag, a line tag, a round tag, a polygon tag, an arrow tag, an icon tag, and a text tag.

Optionally, users can create different augmented reality tags through the augmented reality processor, it is convenient for users to identify different target objects in real-time videos, which is beneficial for users to manage and monitor the scene.

Further, the system further includes a data access server which is adapted for accessing a third-party information system and receiving data from the third-party information system; wherein the augmented reality client is connected with the data access server, and the processing circuitry of the augmented reality client is configured to integrate data from the third-party information system with the real-time video from the video access server and then present the data and the real-time video.

Specifically, the data access server provides an interface through which the data from the third-party information system also can be sent to the augmented reality client and present it in the real-time video, which is conducive to users to use the third-party information system to on-site manage and monitor.

Further, the data from the third-party information system comprises location information, the augmented reality client is adapted for calculating a location of the data from the third-party information system in the real-time video accordingly to the location information and the values of the azimuth angle P, the vertical angle T and the zoom factor Z, integrating the data from the third-party information system with the real-time video from the video access server, and presenting the data from the third-party information system at the corresponding location of the real-time video.

Accordingly to the values of P, T, Z and the location information carried in the data of the third-party information system, the location where the data of the third-party information system is located in the real-time video can be calculated. When the real-time video shot by the video equipment is played at the augmented reality client, the data of the third-party information system is presented at a corresponding location of the real-time video, that is, the real-time video is served as the base map, and the data of the third-party information system is presented on the base map, thereby achieving a video map effect.

Further, the data access server supplies active access data services and passive access data services through which the third-party information system is accessed.

Further, the active access data services comprises accessing the third-party information system by SDK interfaces, API interfaces or databases provided by the third-party information system; and the passive access data services comprises accessing the third-party information system by Http API interfaces provided by the passive access data services.

Since the active access data services and passive access data services are supplied, thus the users may flexibly choose the access manner of third-party information systems in the development platform of the video map engine system.

Further, the video access server is adapted for accessing the video equipments by SDK interfaces, API interfaces or 28281 protocols.

The video access server supplies multiple types of interfaces, thus the users may flexibly choose the access manner of video equipment in the development platform of the video map engine system.

In comparison with the prior art, the advantages of the present invention includes:

(1) Accordingly to the values of P, T, Z, the location where the target location is located in the real-time video can be calculated, and the augmented reality tag can be presented on the corresponding location, that is, the real-time video is served as the base map, and the augmented reality tag is presented on the base map, thereby achieving a video map effect.

(2) The augmented reality tag can move along with the movement of the target location on the video map.

(3) The user may freely create or delete augmented reality tags on the video map.

(4) The data of the third-party information system can be presented on the video map, which is benefit to manage and monitor the scene.

(5) Multiple interfaces are supplied, the user may choose different interfaces to access the video equipment and the third-party information system.

DETAILED DESCRIPTION OF ILLUSTRATED EMBODIMENTS

Figure 1:
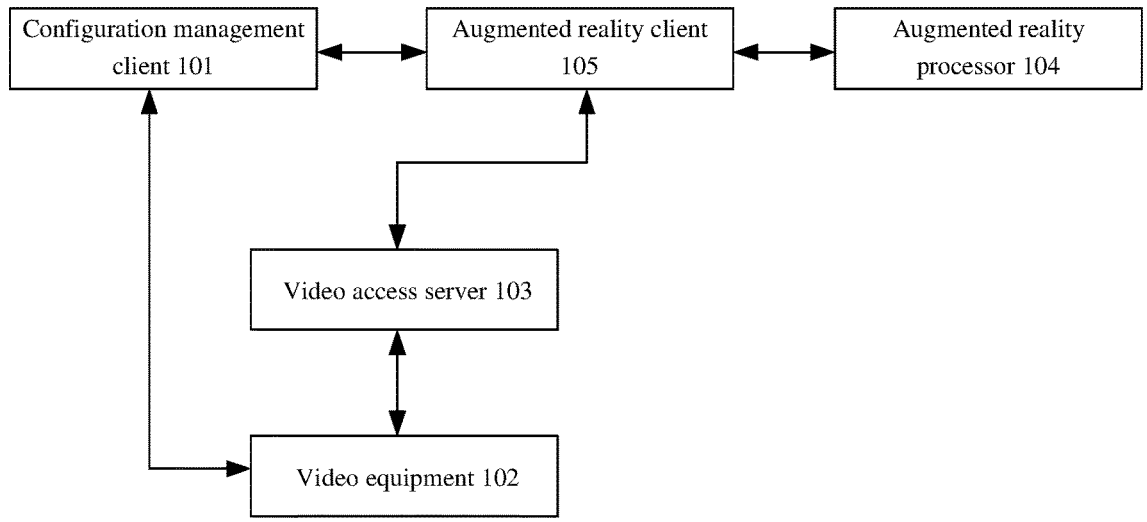
FIG. 1 is a basic structure chart of a video map engine system according to the first embodiment of the present invention.

The drawings are for illustrative purposes only and are not to be construed as limiting the invention.

In order to better illustrate the embodiment, some components of the drawings may be omitted, enlarged or reduced, which does not represent the actual product size.

It will be apparent to those skilled in the art that certain known structures and their descriptions may be omitted.

In the description of the present invention, "multiple" means two or more unless otherwise stated.

In the description of the present invention, it should be noted that the terms "mounting" and "connecting" are to be understood broadly, and may be, for example, a fixed connection, a detachable connection, or an integral; mechanical connection or an electrical connection; it can be directly connected, or indirectly connected through an intermediate medium, or the internal connection of the two elements. The specific meaning of the above terms in the present invention can be understood in the specific circumstances by those skilled in the art.

Various aspects of the invention are disclosed in the following description and related drawings. Alternative solutions are conceivable without departing from the scope of the invention. In addition, some common sense or elements may not be described in the present invention.

Further, many aspects are described in terms of sequences of actions to be performed by elements such as computing devices. It is to be appreciated that the various actions described herein can be performed by a particular circuit (e.g., an application-specific integrated circuit (ASIC)), program instructions executed by one or more processors, or a combination of both. Additionally, the sequence of actions described herein can be considered to be fully encompassed by any form of computer readable storage medium having a corresponding set of computer instructions stored therein. These computer instructions, when executed, will cause the associated processor to perform the functions described herein. Accordingly, the various aspects of the invention may be embodied in a variety of different forms, all of which are considered to be within the scope of the claimed subject matter. The below-mentioned "configuration management client" and "augmented reality client" refer to a hardware device by which data or information may be transmitted, which may refer to any object (such as a device or sensor, etc.) having an addressable interface (such as an Internet Protocol (IP) address, Bluetooth (registered trademark) identifier (ID), near field communication (NFC ID, etc.) that can transmit information to one or more other devices over a wired or wireless connection. "Configuration management client" and "augmented reality client" may have passive communication interfaces such as Quick Response (QR) codes, Radio Frequency Identification (RFID) tags, NFC tags, etc., or have active communication interfaces such as modems, transceivers, transmitter-receiver, etc. For example, the data orchestration device can include, but is not limited to, a cell phone, a computer, a laptop, a tablet computer, and the like.

The technical solution of the present invention will be further described below with reference to the accompanying drawings and embodiments.

First Embodiment

Referring to FIG. 1, a video map engine system includes a configuration management client 101, multiple video equipments 102, a video access server 103, an augmented reality processor 104, and an augmented reality client 105.

Specifically, the configuration management client 101 is adapted for configuring and storing parameters of the video equipments 102. The parameters includes target locations, azimuth angle P, vertical angle T of the target location relative to spatial location of the video equipment, and zoom factor Z of the video equipments 102. The video equipments 102 are adapted for shooting real-time videos, and a part of the video equipments are further adapted for shooting augmented-reality real-time videos.

The video access server 103 connected with the video equipments 102 is adapted for sending the real-time videos to the augmented reality client 105.

The augmented reality processor 104 is adapted for generating augmented reality tags with target locations and sending the augmented reality tags with target locations to the augmented reality client 105, and further adapted for deleting the augmented reality tags with target locations and sending the deleting information to the augmented reality client 105.

The augmented reality client 105 is connected with the configuration management client 101, the video equipments 102, the video access server 103, and the augmented reality processor 104 respectively, and includes processing circuitry which is configured as follows:

once a target location of an augmented reality tag is detected to be a GPS coordinate, calculating a video coordinate of the augmented reality tag presented in the real-time video accordingly to the parameters of the video equipments 102 and the GPS coordinate of the augmented reality tag, integrating the augmented reality tag with the real-time video sent by the video access server 103, and presenting the augmented reality tag at a corresponding location of the real-time video in virtue of the video coordinate; or once a target location of an augmented reality tag is detected to be video coordinate, integrating the augmented reality tag with the real-time video sent by the video access server 103, and presenting the augmented reality tag at a corresponding location of the real-time video in virtue of the video coordinate.

That is, if the target location of the augmented reality tag is the video coordinate, the augmented reality tag can be presented at the corresponding location of the real-time video, without calculating the coordinate. If the target location of the augmented reality tag is the GPS coordinate, then the video coordinate is required to be calculated, thereby determining the location where the augmented reality tag is presented in the real-time video.

When the real-time video shot by the video equipment 102 is played at the augmented reality client 105, the augmented reality tag is presented at a corresponding location of the real-time video, that is, the real-time video is served as the base map, and the augmented reality tag is presented at the target location of the base map, thereby achieving a video map effect.

The augmented reality processor 104 is further adapted for deleting the augmented reality tags with target locations that have been generated, so that the user can manage the augmented reality tags conveniently.

In the first embodiment, the parameters of the video equipment 102 includes azimuth angle P, vertical angle T of the target location relative to spatial location of the video equipment, and zoom factor Z of the video equipment.

By means of the principle of projection, accordingly to the azimuth angle P, the vertical angle T, the zoom factor Z and the GPS coordinate of the augmented reality tag, the location of the augmented reality tag presented in the real-time video (namely the video coordinate of the augmented reality tag) can be calculated out, thereby determining the location where the augmented reality tag presented in the real-time video.

In the first embodiment, the configuration management client 101 is adapted for judging if the values of the azimuth angle P, the vertical angle T and the zoom factor Z is the same with that stored in the configuration management client 101, if no, the augmented reality client 101 is adapted for calculating a new location where the augmented reality tag is presented in the real-time video accordingly to the target location of the augmented reality tag and current values of the azimuth angle P, the vertical angle T and the zoom factor Z, and presenting the augmented reality tag at a corresponding new location of the rear-time video, and the configuration management client 101 is adapted for updating the current values of the azimuth angle P, the vertical angle T and the zoom factor Z; if yes, the location of the augmented reality tag in the rear-time video is not changed.

During shooting the real-time video, the camera lens of the video equipment 102 will move or rotates, that is, the values of P, T, Z relative to the target location will change, and the location where the augmented reality tag is presented at the real-time video will change accordingly. Firstly, the configuration management client 101 judges that if the values of P, T, Z of the video equipment are changed, if yes, augmented reality client 105 needs to recalculate the location where the augmented reality tag is presented at the real-time video; otherwise, the augmented reality tag will not move along with the target location when the real-time video is playing. If the values of P, T, Z are not changed, the target location will not move in the real-time video, and the augmented reality tag is kept in the initial location.

In the first embodiment, the augmented reality tag is composed of at least one point which is a GPS coordinate point of the target location or a video coordinate point.

Specifically, the augmented reality tag can be a point, or a line composed of two points, or a plane composed of multiple points. If the augmented reality tag is a point, this point is the GPS coordinate point or the video coordinate point of the target location; if the augmented reality tag are multiple points, one of the multiple points is the GPS coordinate point or the video coordinate point of the target location, therefore the augmented reality tag with the target location is formed.

In this first embodiment, the augmented reality tag can be a point tag, a line tag, a round tag, a polygon tag, an arrow tag, an icon tag, or a text tag.

Optionally, users can create different augmented reality tags through the augmented reality processor 104, it is convenient for users to identify different target objects in real-time videos, which is beneficial for users to manage and monitor the scene.

During the process of creating the augmented reality tags, users can modify different tag attributes for different kinds of augmented reality tags:

For point tags, point styles, including alignment, color, transparency, size, etc., can be modified.

For line tags, line styles, including alignment, color, transparency, thickness, etc., can be modified.

For round tags, dot center coordinates, lateral diameter, longitudinal diameter, edge pattern, filling style, and the like, can be modified.

For polygon tags, size, edge style, fill style, etc. can be modified.

For arrow tags, start point, end point, arrow width, arrow height, tail connection width, edge style, fill style, etc. can be modified.

For icon tags, icon styles can be modified.

For text tags, text center coordinates, text styles (such as bold, underline, italic, font size, font color) can be modified.

Second Embodiment

Figure 2:
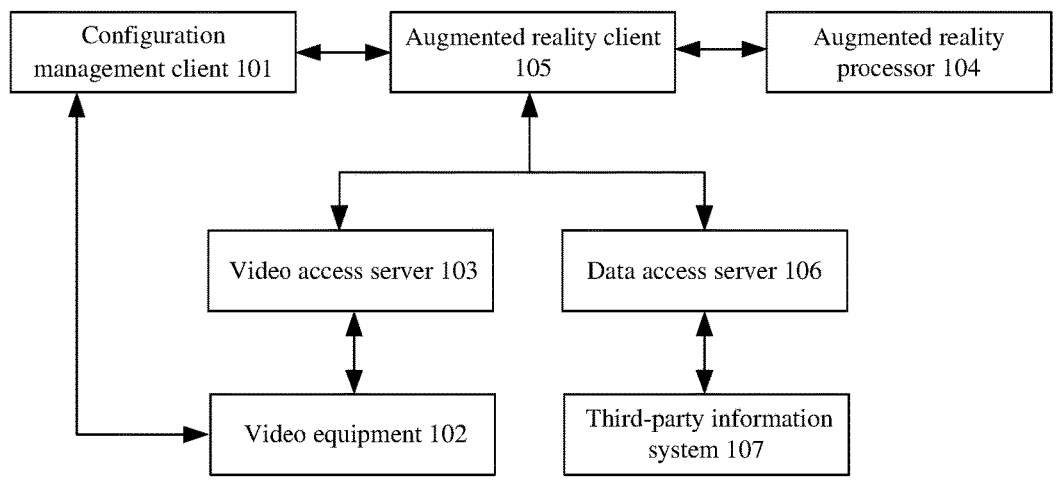
FIG. 2 is a basic structure chart of a third-party information system accessed by a video map engine system according to the second embodiment of the present invention.

As shown in FIG. 2, on the basis of the first embodiment, the video map engine system further includes a data access server 106 which is adapted for accessing a third-party information system 107 and receiving data from the third-party information system 107. The augmented reality client 105 is connected with the data access server 106, and is configured to integrate data from the third-party information system 107 with the real-time video from the video access server 103 and then present the data and the real-time video.

Specifically, the data access server 106 provides an interface through which the data from the third-party information system 107 also can be sent to the augmented reality client 105 and present it in the real-time video, which is conducive to users to use the third-party information system 107 to on-site manage and monitor.

The third-party information system 107 can be a police system, including a police car, a policeman, a device, etc.; or a traffic system, including a traffic light, a traffic police car, a speedometer, and the like.

In the second embodiment, the data sent by the third-party information system 107 is carried with location information, the augmented reality client 105 is adapted for calculating a location of the data from the third-party information system 107 in the real-time video accordingly to the location information and the values of the azimuth angle P, the vertical angle T and the zoom factor Z, integrating the data from the third-party information system 107 with the real-time video from the video access server 103, and presenting the data sent by the third-party information system 107 at the corresponding location in the real-time video.

Accordingly to the values of P, T, Z and the location information carried in the data of the third-party information system 107, the location where the data of the third-party information system 107 is located in the real-time video can be calculated. When the real-time video shot by the video equipment 102 is played at the augmented reality client 105, the data of the third-party information system 107 is presented at a corresponding location of the real-time video, that is, the real-time video is served as the base map, and the data of the third-party information system 107 is presented on the base map, thereby achieving a video map effect.

In this embodiment, the data access server 106 provides active access data services and passive access data services through which the third-party information system is accessed.

Preferably, the active access data services mean accessing the third-party information system by SDK interfaces, API interfaces or databases provided by the third-party information system; and the passive access data services mean accessing the third-party information system by Http API interfaces provided by the passive access data services.

Since the active access data services and passive access data services are supplied, thus the users may flexibly choose the access manner of third-party information systems 107 in the development platform of the video map engine system.

In this embodiment, preferably, the video access server 103 is adapted for accessing the video equipments by SDK interfaces, API interfaces or 28281 protocols.

The video access server 103 supplies multiple types of interfaces, thus the users may flexibly choose the access manner of video equipment 102 in the development platform of the video map engine system.

Figure 3:
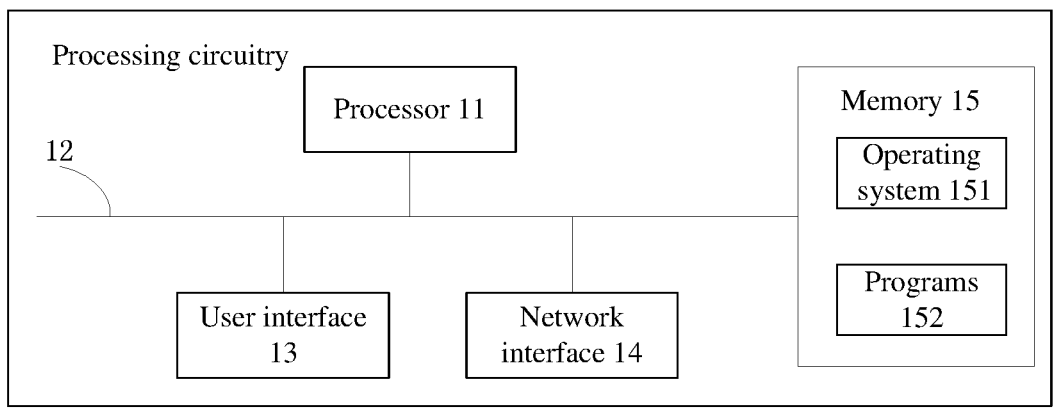
FIG. 3 is a schematic diagram of the processing circuitry according to the present invention.

Referring to FIG. 3, the processing circuitry according to the present invention is shown. As illustrated, the control device includes at least one processor 11, such as a CPU, at least one network interface 14 or other user interfaces 13, a memory 15, and at least one communication bus 12 for communicating above assemblies one another. Specifically, the user interfaces 13 can include USB interfaces, or other standard interfaces, wired interfaces; the network interfaces 14 can be Wi-Fi interfaces or other wireless interfaces. The memory 15 may include high speed RAM memory, or non-volatile memory, such as at least one disk memory. Optionally, the memory 15 can include a storage device located far away from the processor 11.

In some embodiments, the memory 15 stores the following elements, executable modules or data structures, or subsets thereof, or extension sets thereof:

operating system 151, including various system programs, such as a battery management system and the like, for implementing various basic services and processing hardware-based tasks; and programs 152.

Specifically, the processor 11 is used for calling programs 152 stored in the memory 15, and implementing the mentioned above functions, for example integrating the augmented reality tag with the real-time video sent by the video access server 103.

Illustratively, the computer programs can be partitioned into one or more modules/units that are stored in the memory and executed by the processor to perform the present invention. The one or more modules/units may be a series of computer program instruction segments capable of performing a particular function, the instruction segments being used to describe the executions of the computer programs in the processing circuitry.

The processing circuitry may include, but is not limited to, the processor 11 and the memory 15. It will be understood by those skilled in the art that the schematic diagram is merely an example of a processing circuitry, and does not constitute a limitation on the processing circuitry, and may include more or less components, or a combination of some of the components, or different components, such as the control device may also include input and output devices, network access devices, buses, and the like.

The said processor 11 can be central processing unit (CPU), or other general purpose processors, digital signal processor (DSP), application specific integrated circuit (ASIC), field-programmable gate array (FPGA), or other programmable logic devices, discrete gates or transistor logic devices, discrete hardware components, etc. The general purpose processor may be a microprocessor or other conventional processors, and the processor 11 is the control center of the control device, adapted for connecting each part of the processing circuitry by using various interfaces and lines.

The memory 15 can be used to store the computer programs and/or modules, the processor 11 implementing the programs by running or executing the computer programs and/or modules stored in the memory, and recalling data stored in the memory, thereby achieving the various functions of control device. The memory 15 may mainly include a storage program area and a storage data area, wherein the storage program area may store an operating system, at least one application (such as a sound playing function, an image playing function, etc.), and the like. The storage data area can store the data created based on the use of the phone (such as audio data, phone book, etc.). In addition, the memory 15 may include a high-speed random access memory, and may also include a non-volatile memory such as a hard disk, a memory, a plug-in hard disk, a smart memory card (SMC), and a secure digital (SD), a flash card, at least one disk storage device, a flash device, or other volatile solid state storage devices.

Specifically, the modules/units integrated in the processing circuitry can be stored in a computer readable storage medium if implemented in the form of a software functional unit and sold or used as a standalone product. Based on such understanding, all or part of the processes in the foregoing embodiments of the present invention may also be completed by computer programs. The computer programs may be stored in a computer readable storage medium. The steps of the various method embodiments described above may be implemented when the programs are executed by the processor. The computer programs comprise computer program codes, which may be in the form of source codes, object codes, executable files or some intermediate forms. The computer readable medium may include any entity or device capable of carrying the computer program codes, a recording medium, a USB flash drive, a removable hard disk, a magnetic disk, an optical disk, a computer memory, a read-only memory (ROM), a random access memory (RAM), electrical carrier signals, telecommunications signals, and software distribution media. It should be noted that the content contained in the computer readable medium may be appropriately increased or decreased according to the requirements of legislation and patent practice in a jurisdiction, for example, in some jurisdictions, computer readable media does not include electrical carrier signals and telecommunication signals according to legislation and patent practice.

While the invention has been described in connection with what are presently considered to be the most practical and preferable embodiments, it is to be understood that the invention is not to be limited to the disclosed embodiments, but on the contrary, is intended to cover various modifications and equivalent arrangements included within the spirit and scope of the invention.

What is claimed is:

1. A video map engine system, comprising a configuration management client, multiple video equipments, a video access server, an augmented reality processor, and an augmented reality client;

wherein the augmented reality client is connected with the configuration management client, the video equipments, the video access server, and the augmented reality processor respectively;

the configuration management client is adapted for configuring and storing parameters of the video equipments, and sending the parameters of the video equipments to the augmented reality client;

the video equipments are adapted for shooting real-time videos;

the video access server connected with the video equipments is adapted for sending the real-time video to the augmented reality client;

the augmented reality processor is adapted for generating augmented reality tags with target locations and sending the augmented reality tags with target locations to the augmented reality client, and further adapted for deleting the augmented reality tags with target locations and sending deleting information to the augmented reality client;

the augmented reality client comprises processing circuitry which is configured as follows:

once a target location of an augmented reality tag is detected to be a GPS coordinate, calculating a video coordinate of the augmented reality tag presented in the real-time video accordingly to the parameters of the video equipments and the GPS coordinate of the augmented reality tag, integrating the augmented reality tag with the real-time video sent by the video access server, and presenting the augmented reality tag at a corresponding location of the real-time video in virtue of the video coordinate; or once a target location of an augmented reality tag is detected to be video coordinate, integrating the augmented reality tag with the real-time video sent by the video access server, and presenting the augmented reality tag at a corresponding location of the real-time video in virtue of the video coordinate;

wherein the parameters of the video equipments comprise azimuth angle P, vertical angle T of the target location relative to spatial location of the video equipment, and zoom factor Z of the video equipment;

wherein the configuration management client is adapted for judging if the values of the azimuth angle P, the vertical angle T and the zoom factor Z are the same with that stored in the configuration management client, if no, the augmented reality client is adapted for calculating a new location where the augmented reality tag is presented in the real-time video accordingly to the target location of the augmented reality tag and current values of the azimuth angle P, the vertical angle T and the zoom factor Z, and presenting the augmented reality tag at a corresponding new location of the rear-time video, and the configuration management client is adapted for updating the current values of the azimuth angle P, the vertical angle T and the zoom factor Z; if yes, the location of the augmented reality tag in the rear-time video is not changed.

2. The video map engine system according to claim 1, wherein the augmented reality tag is composed of at least one point which is a GPS coordinate point of the target location or a video coordinate point.

3. The video map engine system according to claim 2, wherein the augmented reality tag is one or more selected from a group of a point tag, a line tag, a round tag, a polygon tag, an arrow tag, an icon tag, and a text tag.

4. The video map engine system according to claim 1, further comprising a data access server which is adapted for accessing a third-party information system and receiving data from the third-party information system; wherein the augmented reality client is connected with the data access server, and the processing circuitry of the augmented reality client is configured to integrate data from the third-party information system with the real-time video from the video access server and then present the data and the real-time video.

5. The video map engine system according to claim 4, wherein the data from the third-party information system comprises location information, the augmented reality client is adapted for calculating a location of the data from the third-party information system in the real-time video accordingly to the location information and the values of the azimuth angle P, the vertical angle T and the zoom factor Z, integrating the data from the third-party information system with the real-time video from the video access server, and presenting the data from the third-party information system at the corresponding location of the real-time video.

6. The video map engine system according to claim 5, wherein the data access server supplies active access data services and passive access data services through which the third-party information system is accessed.

7. The video map engine system according to claim 6, wherein the active access data services comprises accessing the third-party information system by SDK interfaces, API interfaces or databases provided by the third-party information system; and the passive access data services comprises accessing the third-party information system by Http API interfaces provided by the passive access data services.

8. The video map engine system according to claim 7, wherein the video access server is adapted for accessing the video equipments by SDK interfaces, API interfaces or 28281 protocols.

9. The video map engine system according to claim 4, wherein the data access server supplies active access data services and passive access data services through which the third-party information system is accessed.

10. The video map engine system according to claim 9, wherein the active access data services comprises accessing the third-party information system by SDK interfaces, API interfaces or databases provided by the third-party information system; and the passive access data services comprises accessing the third-party information system by Http API interfaces provided by the passive access data services.

11. The video map engine system according to claim 10, wherein the video access server is adapted for accessing the video equipments by SDK interfaces, API interfaces or 28281 protocols.

* * * * *